United States Patent
Park et al.

(10) Patent No.: US 8,583,761 B2
(45) Date of Patent: Nov. 12, 2013

(54) SYSTEM AND METHOD FOR PRODUCTION OF MULTIUSER NETWORK GAME

(75) Inventors: Chong Mok Park, Seoul (KR); Seok Hyon Seong, Yongin-si (KR); Kangin Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 817 days.

(21) Appl. No.: 12/620,278

(22) Filed: Nov. 17, 2009

(65) Prior Publication Data

US 2010/0124992 A1    May 20, 2010

(30) Foreign Application Priority Data

Nov. 20, 2008 (KR) ........................ 10-2008-0115868

(51) Int. Cl.
- G06F 15/16 (2006.01)
- G06F 9/45 (2006.01)
- G06F 17/00 (2006.01)
- G06T 15/00 (2011.01)

(52) U.S. Cl.
USPC ............. 709/218; 717/102; 463/39; 345/419; 709/231

(58) Field of Classification Search
USPC .................................................. 717/124–136
See application file for complete search history.

(56) References Cited

U.S. PATENT DOCUMENTS

| | | | | |
|---|---|---|---|---|
| 6,557,041 | B2 * | 4/2003 | Mallart | 709/231 |
| 7,613,800 | B2 * | 11/2009 | Dhupelia et al. | 709/223 |
| 2002/0066071 | A1 * | 5/2002 | Tien et al. | 717/102 |
| 2003/0171147 | A1 * | 9/2003 | Sinclair et al. | 463/39 |
| 2007/0044078 | A1 * | 2/2007 | Cifra | 717/135 |
| 2008/0201751 | A1 * | 8/2008 | Ahmed et al. | 725/109 |
| 2008/0254862 | A1 * | 10/2008 | Mattice et al. | 463/25 |
| 2008/0268959 | A1 * | 10/2008 | Bryson et al. | 463/42 |
| 2008/0303811 | A1 * | 12/2008 | Van Luchene | 345/419 |
| 2010/0217837 | A1 * | 8/2010 | Ansari et al. | 709/218 |

FOREIGN PATENT DOCUMENTS

| JP | 2002-073585 | 3/2002 |
|---|---|---|
| JP | 2003-340158 | 12/2003 |
| JP | 2005-250937 | 9/2005 |

OTHER PUBLICATIONS

Yuka Kirishima, "Basic knowledge of network game", The ABCs of network game, Part 1C Magazine, Jun. 1, 2002, pp. 30-38, vol. 14, No. 6, Softbank Pub., Inc.

(Continued)

*Primary Examiner* — Don Wong
*Assistant Examiner* — Mohammad Kabir
(74) *Attorney, Agent, or Firm* — H.C. Park & Associates, PLC

(57) ABSTRACT

Provided is a system and method for production of a multi-user network game that may produce and debug a multi-user network game and simply construct a multi-user network game environment using a single game production tool to thereby reduce a game production time. A system for production of a multi-user network game being performed between a game server and a plurality of game clients via a network, may include: a game production module configured to produce and debug the multi-user network game and a multi-user network game execution environment; and an emulation module configured to emulate an execution of the multi-user network game by constructing a virtual network execution environment that comprises at least one server virtual machine and at least one client virtual machine configured to execute the produced or debugged multi-user network game.

19 Claims, 21 Drawing Sheets

(56) References Cited

OTHER PUBLICATIONS

Toshio Yoshida, et al., "A Development Method for Embedded Systems in Distributed Environment Using a Virtual OS and Virtual Network", IPSJ Report, Feb. 2, 1998, pp. 239-244, vol. 98, No. 15, Information Processing Society of Japan.

Yoshiki Nishikawa, et al., "Large-scale Distributed System Test Bed by Using Process-level Virtualization", IPSJ Transactions on Advanced Computing Systems, Aug. 2008, pp. 144-156, vol. 1, No. 2.

\* cited by examiner

SYSTEM AND METHOD FOR PRODUCTION OF MULTIUSER NETWORK GAME

CROSS-REFERENCE TO RELATED APPLICATION

This application claims priority from and the benefit of Korean Patent Application No. 10-2008-0115868, filed on Nov. 20, 2008, which is hereby incorporated by reference for all purposes as if fully set forth herein.

BACKGROUND OF THE INVENTION

1. Field of the Invention

Exemplary embodiments of the present invention relate to a system and method for production of a multi-user network game. More particularly, the present invention relates to a system and method for production of a multi-user network game that may produce and debug a multi-user network game and simply construct a multi-user network game environment using a single game production tool to thereby reduce a game production time.

2. Discussion of the Background

Currently, computers are widely distributed and used. Accordingly, network games using the computers are in development. Companies programming the network games using a game production tool are investing a great amount of manpower to provide various types of network games. A game production tool is a tool to complete a game by combining contents constituting a user interface (for example, design elements, sound, and the like) and logic required to perform the game.

In the case of a network game, multi-user games enabling a plurality of users to simultaneously play a single game are currently becoming popular.

However, most conventional game production tools are based on a single-user game played by a single user.

Accordingly, a conventional method for production of a multi-user network game may include the steps of: developing a game client using a game production tool configured to develop the game client; developing a game server using another game production tool configured to develop the game server; and repeatedly executing the developed game client and game server to construct a network execution environment and a multi-play execution environment.

The conventional method for the production of the multi-user network game may have the following problems.

First, since each of the game client and the game server needs to be developed using a separate game production tool, it generally takes a long time to produce the multi-user network game.

Second, the network execution environment and the multi-play execution environment are different for each network game service system. Accordingly, a process of modifying a game that is developed to be installed in a corresponding network game service system and to interoperate with another server system may need to be performed. Specifically, it may be difficult to easily provide a network game service.

SUMMARY OF THE INVENTION

Exemplary embodiments of the present invention provide a system and method for production of a multi-user network game that may produce and debug a multi-user network game and simply construct a multi-user network game environment using a single game production tool to thereby reduce a game production time.

Additional features of the invention will be set forth in the description which follows, and in part will be apparent from the description, or may be learned by practice of the invention.

An exemplary embodiment of the present invention discloses a system for production of a multi-user network game being performed between a game server and a plurality of game clients via a network, the system including: a game production module configured to produce and debug the multi-user network game and a multi-user network execution environment; and an emulation module configured to emulate an execution of the multi-user network game by constructing a virtual network execution environment that includes at least one server virtual machine and at least one client virtual machine configured to execute the produced or debugged multi-user network game.

An exemplary embodiment of the present invention also discloses a method for production of a multi-user network game being performed between a game server and a plurality of game clients via a network, the method including the steps of: executing a game production module for the production of the multi-user network game to provide a game production screen; producing a game script for the multi-user network game based on a script language using the game production module; constructing, in a game preview step, a virtual network execution environment that includes at least one server virtual machine and at least one client virtual machine configured to execute the game script to thereby emulate an execution of the game script in the virtual network execution environment; and debugging the game script according to a result of the game preview step.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
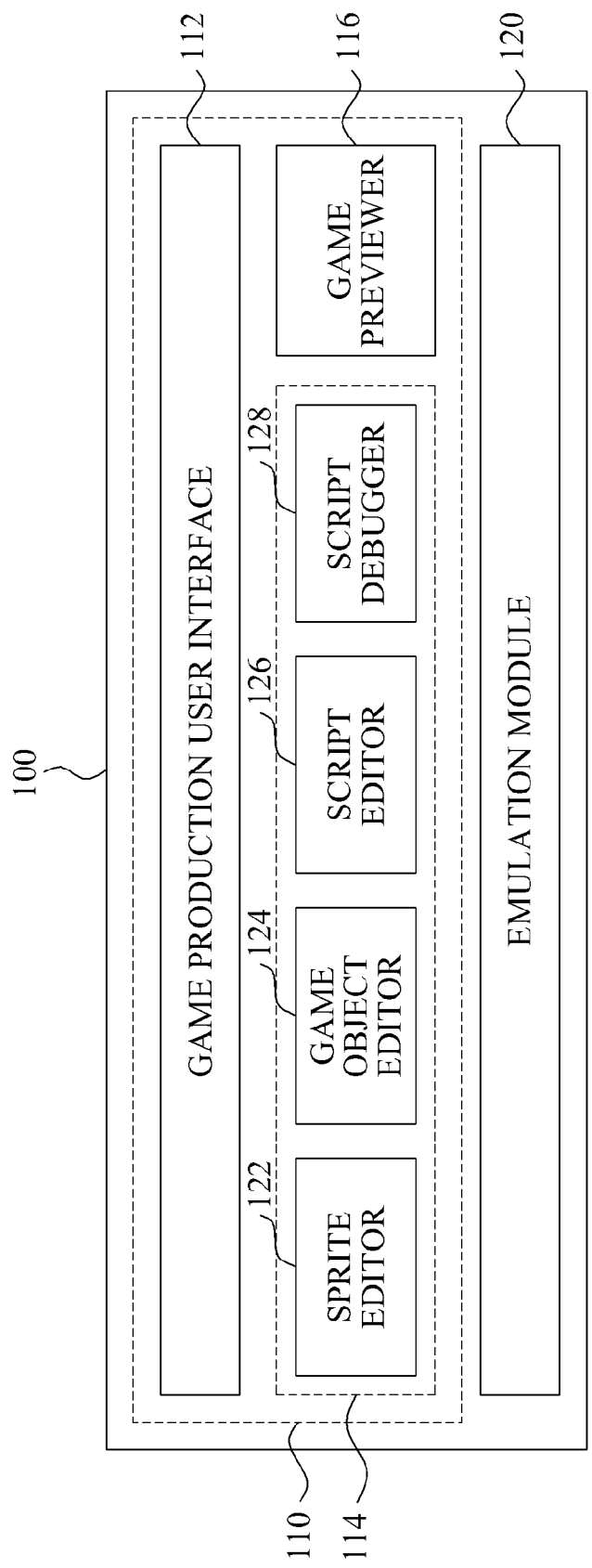
FIG. 1 is a block diagram illustrating a configuration of a system for production of a multi-user network game according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

According to exemplary embodiments of the present invention, a multi-user network game produced using an emulation module by generating each of a client virtual machine and a server virtual machine for executing and debugging the multi-user network game may be emulated in a virtual network execution environment. Through this, it is possible to produce and debug the multi-user network game in a game production environment and simply construct a multi-user network game environment using a single game production tool and to thereby reduce a game production time.

Also, according to exemplary embodiments of the present invention, a virtual machine container may include a client virtual machine container and a server virtual machine container that independently operate with each other in a virtual network environment. Accordingly, in a network execution environment of an actual multi-user network game, when it is set to drive the client virtual machine container in a user client, to drive the server virtual machine container in an online game server, and to use an actual network instead of using a network emulator, it is possible to drive a client virtual machine and a server virtual machine in an online service environment. Therefore, it is possible to easily install, in a multi-user network game service system, the multi-user network game developed by a production system, and to enable the multi-user network game to interoperate with other server systems.

FIG. 1 is a block diagram illustrating a configuration of a multi-user network game production system 100 for production of a multi-user network game according to an exemplary embodiment of the present invention.

Referring to FIG. 1, the multi-user network game production system 100 may include a game production module 110 configured to produce and debug the multi-user network game and a multi-user network execution environment, and an emulation module 120 configured to provide the virtual network execution environment and to emulate, in the virtual network execution environment, the multi-user network game that is produced by generating each of at least one client virtual machine and at least one server virtual machine for executing and debugging the multi-user network game. The at least one client virtual machine and at least one server virtual machine may be configured to execute the produced or debugged multi-user network game.

The game production module 110 may include a game production user interface 112, a game edit tool 114, and a game previewer 116.

The game production user interface 112 may provide a user with a user interface for the production of the multi-user network game using a game production screen. Therefore, the user may create the multi-user network game and a network execution environment by manipulating the game edit tool 114 via the game production user interface 112. The game production user interface 112 may support a full screen mode and a single window mode on a computer operating system, such as WINDOWS®. The game production user interface 112 may be based on an object-oriented program language.

The game edit tool 114 may provide the user or a developer with a multi-user network game production environment in a game production environment, so that the user or the developer may perform generating/editing a sprite or an image, defining/generating/editing a game object appearing in a corresponding game, and generating/editing or debugging a client game script and a server game script for executing the game and a network environment.

The game edit tool 114 may include a sprite editor 122 configured to produce an object independently moving in the game or constituting a background, a game object editor 124 configured to produce an object that needs a motion in the game, a script editor 126 configured to produce a game script defining a game play environment of the object based on a script language, and a script debugger 128 configured to debug the game script. The script language may include, for example, JAVASCRIPT®, VBScript, PYTHON®, LUA®, and the like. Any type of script languages providing an object-oriented model may be used.

The game previewer 116 may drive the emulation module 120 to display, on the game production screen, an execution process of the produced multi-user network game. The game previewer 116 may emulate, in a virtual network environment, a script of the multi-user network game that is produced via the game edit tool 114, and thereby enable the user to preview an emulation result of the multi-user network game.

The emulation module 120 may construct the virtual network environment in the multi-user network game production environment to emulate the multi-user network game. For example, the emulation module 120 may emulate the multi-user network game and the network execution environment by constructing the virtual network environment where at least one game room, that is, at least one server virtual machine and at least one game client (i.e., client virtual machine) may participate.

Figure 2:
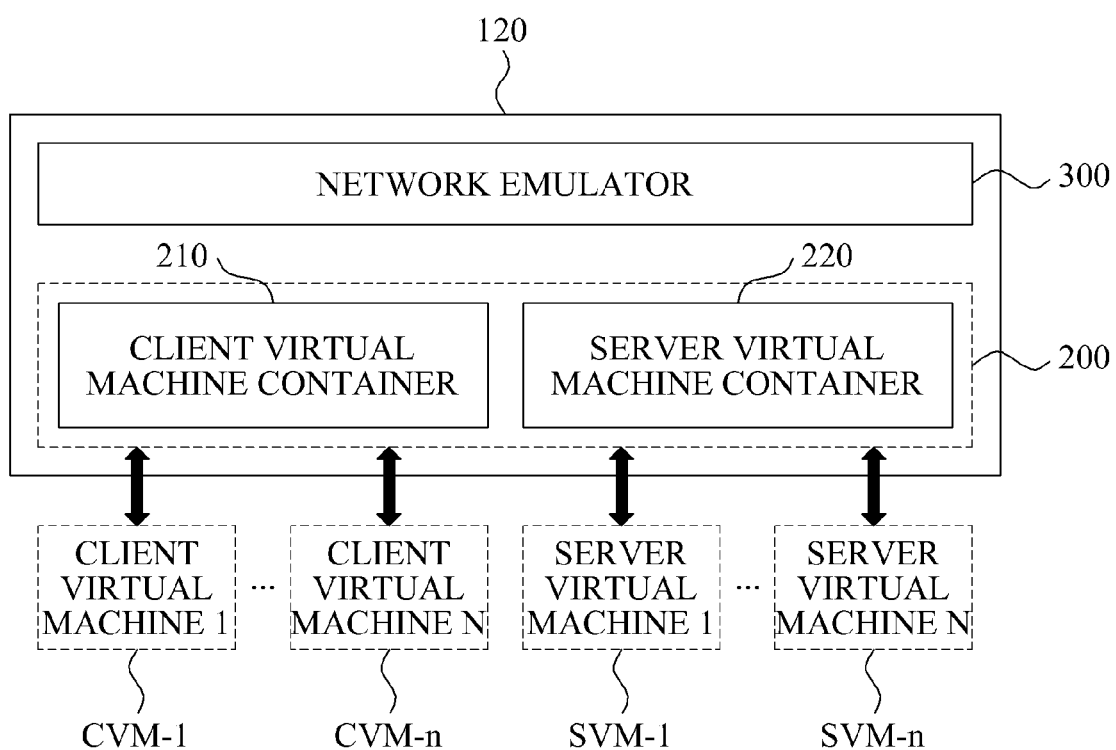
FIG. 2 is a block diagram for describing an emulation module of FIG. 1.

For this, as shown in FIG. 2, the emulation module 120 may include a virtual machine container 200 and a network emulator 300.

The virtual machine container 200 may include a client virtual machine container 210 configured to manage client virtual machines CVM-1 through CVM-n, and a server virtual machine container 220 configured to manage server virtual machines SVM-1 through SVM-n. Therefore, in the game production environment, the virtual machine container 200 may drive the client virtual machine container 210 and the server virtual machine container 220 in the same environment to thereby construct the virtual network environment in an integrated production environment. In an actual network service environment, the virtual machine container 200 may drive the client virtual machine container 210 in a user personal computer (PC) that is a client, and drive the server virtual machine container 220 in an online game server system, so that a game produced in the game production environment may operate comparably even in an actual online game service environment.

Figure 3:
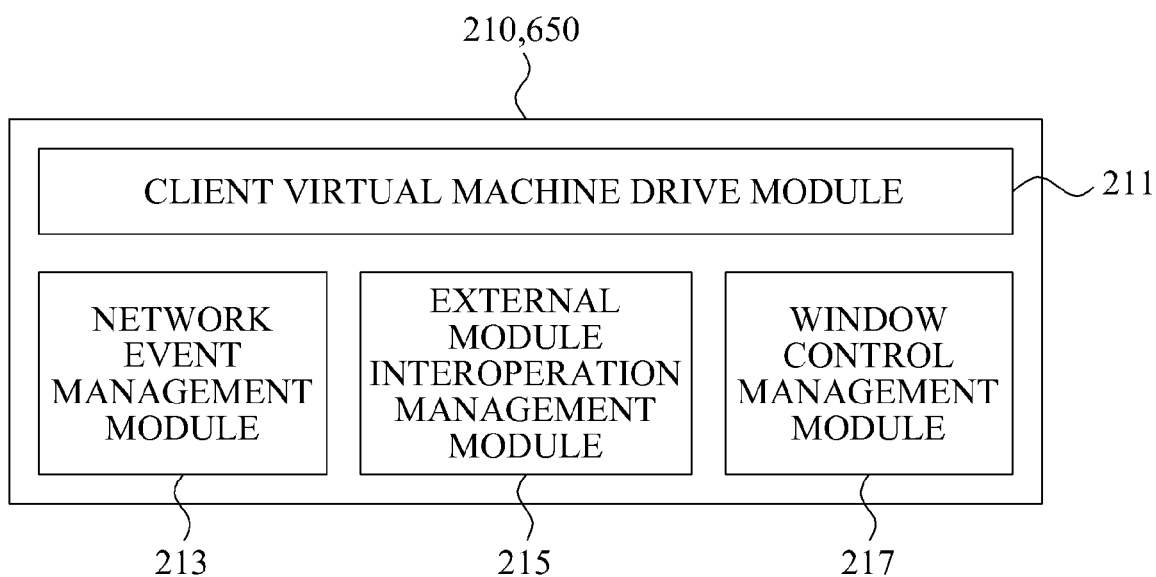
FIG. 3 is a block diagram for describing a client virtual machine container of FIG. 2.

As shown in FIG. 3, according to an exemplary embodiment of the present invention, the client virtual machine container 210 may include a client virtual machine drive module 211, a network event management module 213, an external module interoperation management module 215, and a window control management module 217.

The client virtual machine drive module 211 may generate and manage a number of client virtual machines CVM-1 through CVM-n corresponding to a numeral set by the user, using a client virtual machine application programming interface (API) provided from the client virtual machines CVM-1 through CVM-n.

The network event management module 213 may transfer an event between each of the client virtual machines CVM-1 through CVM-n and each of the server virtual machines SVM-1 through SVM-n via the client virtual machine drive module 211. Here, when a network event (for example, a transmission/reception of a network packet, a network connection, a network disconnection, or the like) occurs, the network event management module 213 may convert the network event to a format that may be understood by each of the client virtual machines CVM-1 through CVM-n.

The external module interoperation management module 215 may conduct the interoperation of each of the client virtual machines CVM-1 through CVM-n with a service system for an extrinsic online service of a game while the multi-user network game is being executed. For this, the external module interoperation management module 215 may include a protocol for an interoperation with an external module, and support a communication between the external module and each of the client virtual machines CVM-1 through CVM-n using a function callback. Here, the protocol may be different for each game service. Accordingly, the external module interoperation management module 215 may connect the virtual machine container 200 and the external module needing the communication with each of the client virtual machines CVM-1 through CVM-n, in a plug-in form. The service system for the extrinsic online service of the game may be, for example, a lobby server, a room server, a database module, a ranking service server, a location management service server, or the like.

The window control management module 217 may transfer, to each of the client virtual machines CVM-1 through CVM-n via the client virtual machine drive module 211, a game window displaying a screen of the multi-user network game and a game event occurring in the game window. Specifically, the window control management module 217 may generate the game window and coordinate a location of the game window to transfer, to each of the client virtual machines CVM-1 through CVM-n, the game event such as a mouse click, a keyboard input, or the like, occurring in the game window.

Figure 4:
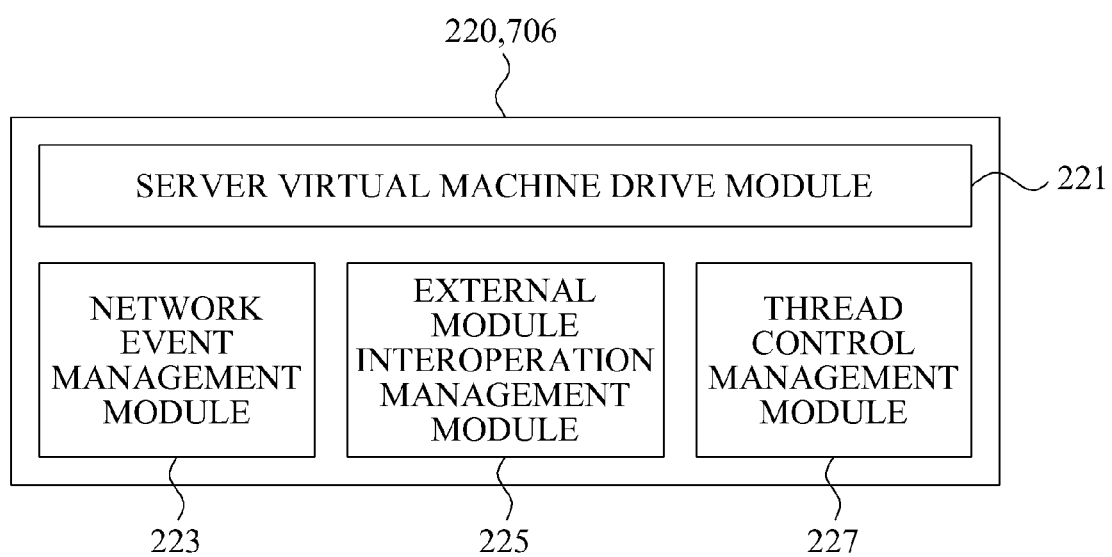
FIG. 4 is a block diagram for describing a server virtual machine container of FIG. 2.

As shown in FIG. 4, according to an exemplary embodiment of the present invention, the server virtual machine container 220 may include a server virtual machine drive module 221, a network event management module 223, an external module interoperation management module 225, and a thread control management module 227.

The server virtual machine drive module 221 may generate and manage a number of server virtual machines SVM-1 through SVM-n corresponding to a numeral set by the user, using a server virtual machine API provided from the server virtual machines SVM-1 through SVM-n. Generally, each of the server virtual machines SVM-1 through SVM-n may indicate a single game room.

The network event management module 223 may transfer, to each of the server virtual machines SVM-1 through SVM-n, via the server virtual machine drive module, a network event that occurs while the multi-user network game is being executed. Here, when the network event, for example, a transmission/reception of a network packet, a network connection, a network disconnection, or the like, occurs, the network event management module 223 may convert the network event to a format that may be understood by each of the server virtual machines SVM-1 through SVM-n.

The external module interoperation management module 225 may conduct the interoperation of each of the server virtual machines SVM-1 through SVM-n with a service system for an extrinsic online service of a game while the multi-user network game is being executed. For this, the external module interoperation management module 225 may include a protocol for an interoperation with service systems, and support a communication between the service systems and the server virtual machines SVM-1 through SVM-n using a function callback. Here, the protocol may be different for each game service. Accordingly, the external module interoperation management module 225 may connect the virtual machine container 200 and the service systems needing the communication with each of the server virtual machines SVM-1 through SVM-n, in a plug-in form. The service systems for the extrinsic online service of the game may include, for example, a database server, a ranking service server, a location management service server, and the like.

The thread control management module 227 may provide a thread pool so that the server virtual machine drive module 221 may generate and manage the plurality of server virtual machines SVM-1 through SVM-n. Here, the thread pool may be required since the number of server virtual machines SVM-1 through SVM-n may vary according to the capacity of a game server (for example, the number may increase or decrease to be suitable for the capacity of the game server). When executing the game, the thread control management module 227 may drive the server virtual machines SVM-1 through SVM-n by allocating an available thread to the server virtual machines SVM-1 through SVM-n.

The server virtual machine container 220 may further include a timer event management module (not shown) configured to transfer, to each of the server virtual machines SVM-1 through SVM-n via the server virtual machine drive module 221, a timer event occurring in the execution of the multi-user network game.

Figure 5:
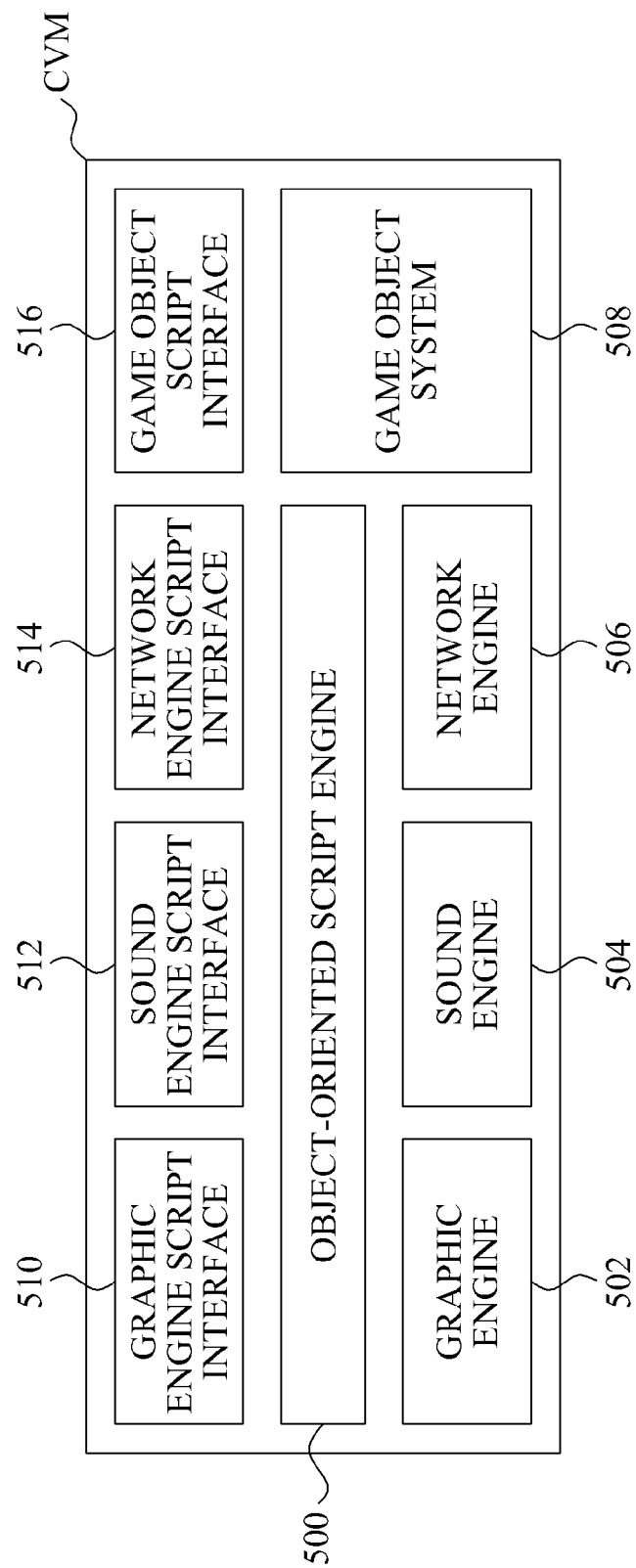
FIG. 5 is a block diagram for describing a client virtual machine of FIG. 2.

As shown in FIG. 5, each of the client virtual machines CVM-1 through CVM-n of FIG. 2 may include an object-oriented script engine 500, a graphic engine 502, a sound engine 504, a network engine 506, a game object system 508, a graphic engine script interface 510, a sound engine script interface 512, a network engine script interface 514, and a game object script interface 516.

The object-oriented script engine 500 may provide an execution environment of a script file generated using an object-oriented program language.

The graphic engine 502 may provide an execution environment for rendering, animation, and design on a screen of the multi-user network game.

The sound engine 504 may provide a sound execution environment of the multi-user network game.

The network engine 506 may convert, to a network event, network messages that are generated within a game script being performed by a client virtual machine and that are transferred, and may transfer the network event to the client virtual machine container 210 managing the client virtual machine. In this case, the network event management module 213 of the client virtual machine container 210 may provide an environment for a network communication with each client and server by transferring the network event to another client virtual machine and/or server virtual machine via the network emulator 300.

The game object system 508 may be in charge of managing objects generated within the game script being performed by the client virtual machine, transferring a message between the objects, processing the game event, and managing statuses of game objects. In the case of the message transfer between the objects, when an object to receive the message is an object generated in another client virtual machine and/or server virtual machine, the message may be transferred via the network engine 506.

The graphic engine script interface 510 may provide an interface between the game script and the graphic engine 502 using the object-oriented script engine 500.

The sound engine script interface 512 may provide an interface between the game script and the sound engine 504 using the object-oriented script engine 500.

The network engine script interface 514 may provide an interface between the game script and the network engine 506 using the object-oriented script engine 500.

The game object script interface 516 may provide an interface between the game script and the game object system 508 using the object-oriented script engine 500.

Figure 6:
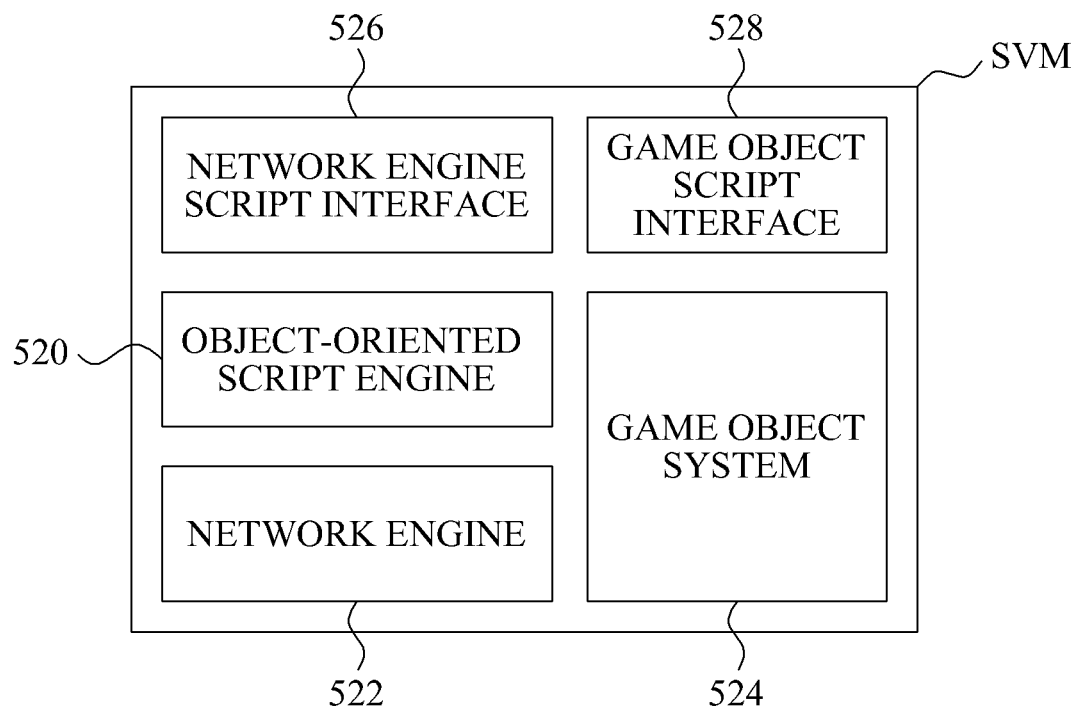
FIG. 6 is a block diagram for describing a server virtual machine of FIG. 2.

As shown in FIG. 6, each of the server virtual machines SVM-1 through SVM-n of FIG. 2 may include an object-oriented script engine 520, a network engine 522, a game object system 524, a network engine script interface 526, and a game object script interface 528.

The object-oriented script engine 520 may provide an execution environment of a script file generated using an object-oriented program language.

The network engine 522 may convert, to a network event, network messages that are generated within a game script being performed by a client virtual machine and that are transferred, and may transfer the network event to the server virtual machine container 220 managing the server virtual machine. In this case, the network event management module 223 of the server virtual machine container 220 may provide an environment for a network communication with each client and server by transferring the network event to another client virtual machine and/or server virtual machine via the network emulator 300.

The game object system 524 may be in charge of managing objects generated within the game script being performed by the server virtual machine, transferring a message between the objects, processing the game event, and managing statuses of game objects. In the case of the message transfer between the objects, when an object to receive the message is an object generated in another client virtual machine and/or server virtual machine, the message may be transferred via the network engine 522.

The network engine script interface 526 may provide an interface between the game script and the network engine 522 using the object-oriented script engine 520.

The game object script interface 528 may provide an interface between the game script and the game object system 524 using the object-oriented script engine 520.

The network emulator 300 of FIG. 2 may manage a network socket, a network identifier (ID), and a message queue, and may emulate a network message transfer process. In doing so it may provide a virtual network execution environment as if the user is connected to an actual network, and enable an analysis of the transferred message. Here, the network ID may be used as a virtual address to indicate a connection of the network socket and thus may enable a message transmission without using an actual network address.

Figure 7:
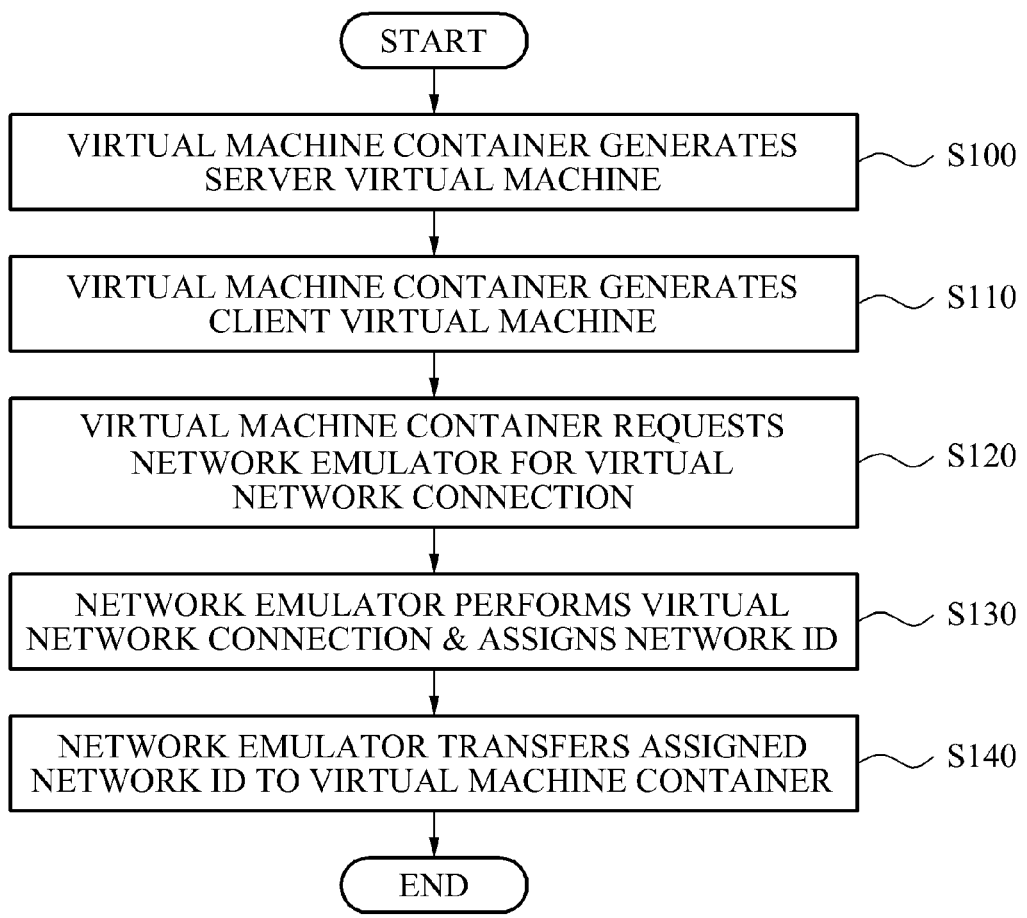
FIG. 7 is a flowchart illustrating a process of driving a virtual machine container and a network emulator according to an exemplary embodiment of the present invention.

FIG. 7 is a flowchart illustrating a process of driving a virtual machine container 200 and a network emulator 300 according to an exemplary embodiment of the present invention. Specifically, FIG. 7 illustrates a network connection process when each of client virtual machines and server virtual machines is initiated.

The virtual machine container 200 may generate and manage a plurality of client virtual machines and a plurality of server virtual machines, and include a table containing "virtual machine-network ID" for a network connection. The network emulator 300 may also include a table containing a network ID-network socket in order to manage its management targets.

Hereinafter, the process of driving the virtual machine container 200 and the network emulator 300 according to an exemplary embodiment of the present invention will be described with reference to FIG. 2 and FIG. 7.

In operation S100, the virtual machine container 200 generates a server virtual machine.

In operation S110, the virtual machine container 200 generates a client virtual machine.

In operation S120, the virtual machine container 200 requests the network emulator 300 for a virtual network connection. Specifically, in operation S120, the virtual machine container 200 may transfer, to the network emulator 300, a request to connect the client virtual machine and the server virtual machine.

In operation S130, the network emulator 300 performs the virtual network connection and then assigns a network ID. Specifically, in operation S130, the network emulator 300 may perform the virtual network connection and then add, to a table, a network ID and a network socket corresponding to the network connection.

In operation S140, the network emulator 300 transfers the assigned network ID to the virtual machine container 200. Specifically, in operation S140, the network emulator 300 may transfer, to the virtual machine container 200, the network ID that is added to the table. Accordingly, the virtual machine container 200 may complete the network connection process by adding, to a table, a virtual machine-network ID corresponding to the network connection that is transferred from the network emulator 300.

Figure 8:
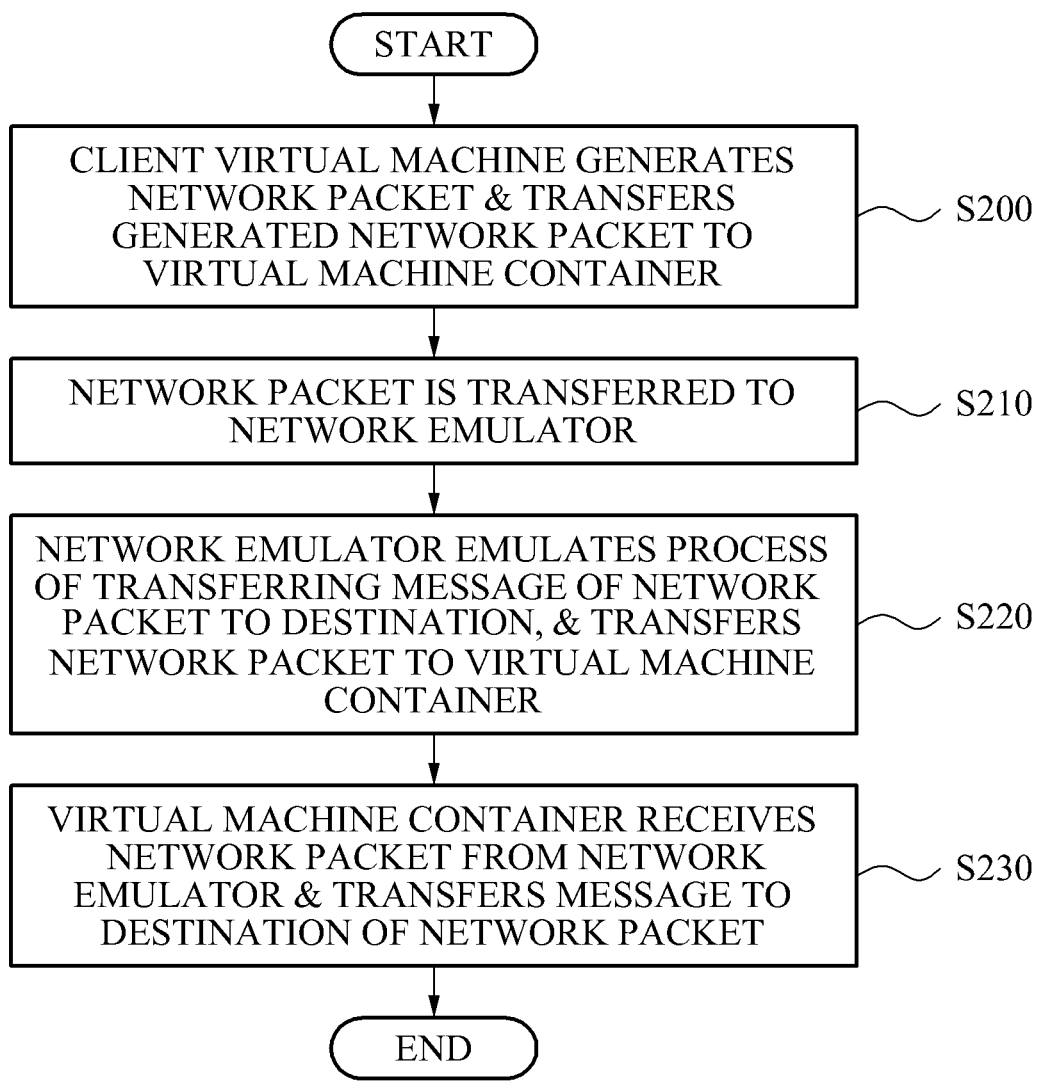
FIG. 8 is a flowchart illustrating a process of transmitting a message from a client virtual machine to a server virtual machine according to an exemplary embodiment of the present invention.

FIG. 8 is a flowchart illustrating a process of transmitting a message from a client virtual machine to a server virtual machine according to an exemplary embodiment of the present invention.

Hereinafter, the process of transmitting the message from the client virtual machine to the server virtual machine according to an exemplary embodiment of the present invention will be described with reference to FIG. 2 and FIG. 8.

In operation S200, the client virtual machine generates a network packet and transfers the generated network packet to the virtual machine container 200. Here, when the client virtual machine transfers a message to the virtual machine container 200, the client virtual machine may generate the network packet in a form of "origination, destination, and message". Each of the origination and the destination may correspond to a network ID. The message may correspond to game execution information.

In operation S210, the network packet transferred from the client virtual machine is transferred to the network emulator 300 via the virtual machine container 200.

In operation S220, the network emulator 300 emulates a process of transferring the message of the network packet to the destination, and transfers the network packet to the virtual machine container 200. Specifically, the network emulator 300 may emulate a process of receiving the network packet to transfer the message to a network socket corresponding to the network ID of the destination. In particular, the network emulator 300 may emulate a network characteristic that the message is accumulated in a queue in a form of a packet. The network emulator 300 may transfer, to the virtual machine container 200, the network packet in a form of "origination, destination, and message".

In operation S230, the virtual machine container 200 receives the network packet from the network emulator 300, and transfers the message to the destination of the network packet. Here, the virtual machine container 200 may determine a virtual machine to transfer the message based on the destination of the network packet transferred from the network emulator, and may transfer the message to the determined virtual machine. For example, when a network ID of the destination corresponds to a network ID of a server virtual machine, the virtual machine container 200 may transfer the message to the server virtual machine.

Figure 9:
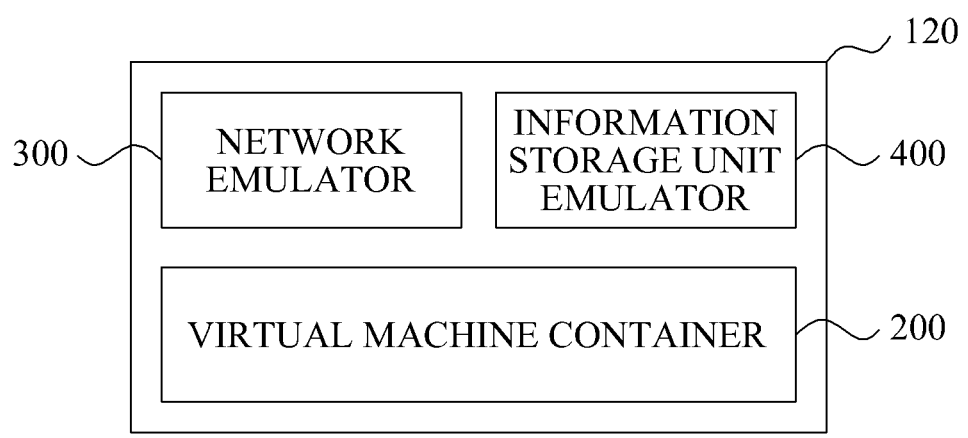
FIG. 9 is a block diagram for describing the emulation module of FIG. 1 according to another exemplary embodiment of the present invention.

As shown in FIG. 9, the emulation module 120 of FIG. 2 may further include an information storage unit emulator 400.

Figure 10:
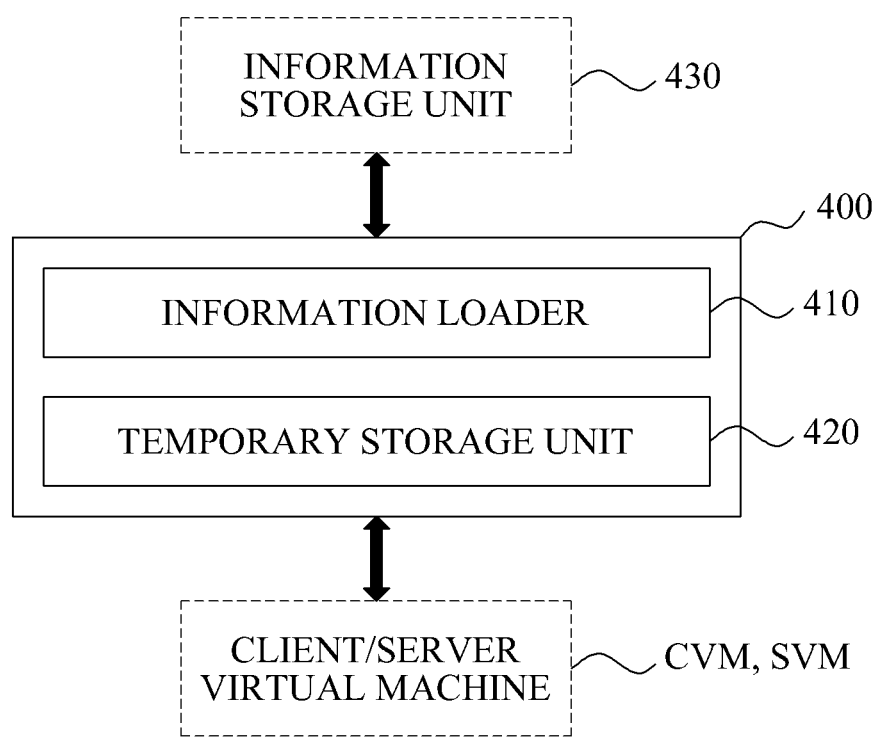
FIG. 10 is a block diagram for describing an information storage unit emulator of FIG. 9.

The information storage unit emulator 400 may provide a simulation function with respect to an information storage unit (not shown) configured to store extrinsic information of a virtual game by emulating an information transfer between each of client virtual machines and server virtual machines, and the information storage unit 430, which is shown in FIG. 10. Here, the extrinsic information of the virtual game may include an ID of a game player, membership information, a game grade, and the like. The information storage unit 430 may be a database configured to store the extrinsic information. The extrinsic information may be stored in a form of a script file generated using a script language.

As shown in FIG. 10, the information storage unit emulator 400 may include an information loader 410 and a temporary storage unit 420.

The information loader 410 may load extrinsic information of a corresponding game from an information storage unit 430 in response to a request for an information transfer from at least one of the client virtual machines and the server virtual machines using the virtual machine container 200.

The temporary storage unit 420 may store the extrinsic information that is loaded from the information loader 410, and may transfer the loaded extrinsic information to a corresponding client virtual machine and/or server virtual machine via the virtual machine container 200.

Figure 11:
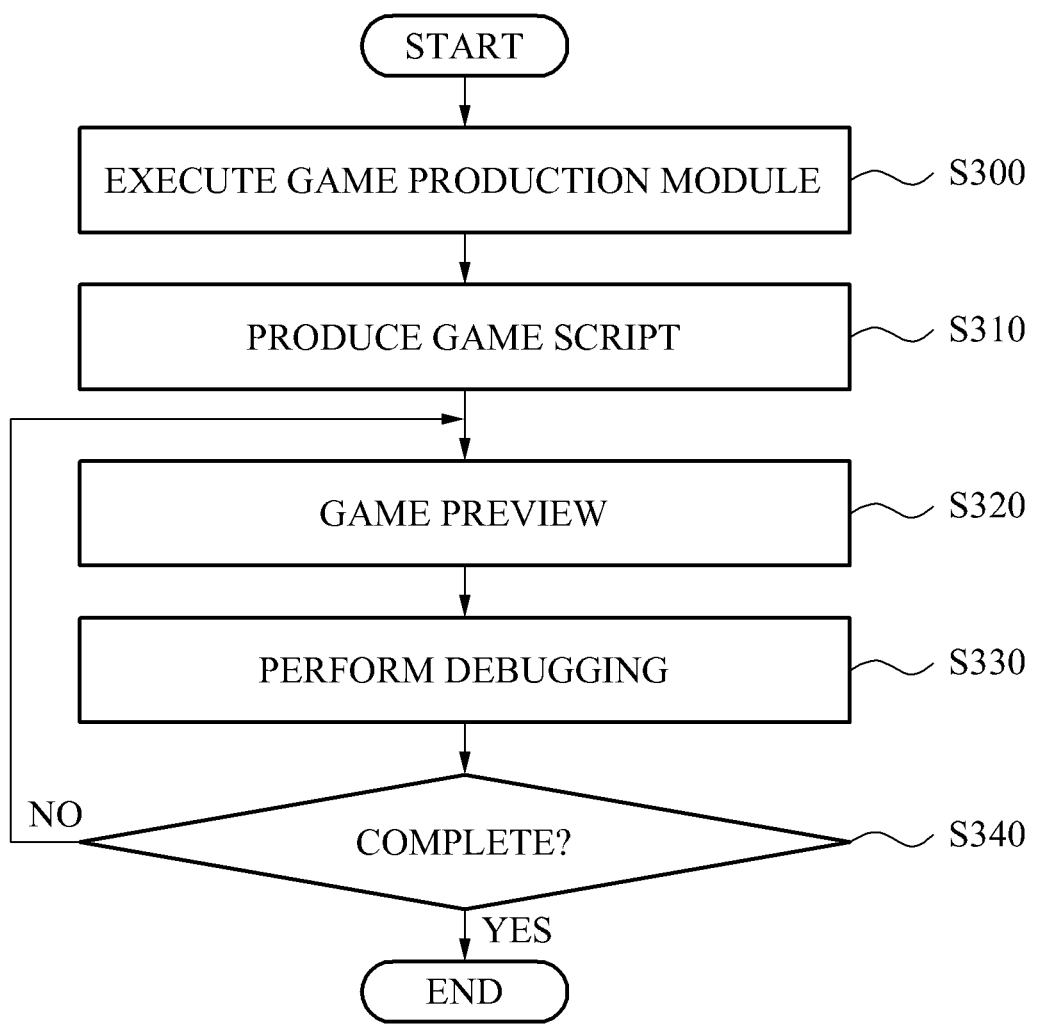
FIG. 11 is a flowchart illustrating a method for production of a multi-user network game according to an exemplary embodiment of the present invention.

FIG. 11 is a flowchart illustrating a method for production of a multi-user network game according to an exemplary embodiment of the present invention.

Hereinafter, the method for the production of the multi-user network game according to an exemplary embodiment of the present invention will be described with reference to FIG. 2 and FIG. 11. The operations and steps may be stored as part of an executable program on a non-transitory computer-readable storage medium, where the program may instruct a microprocessor to perform the operations and steps.

Figure 12:
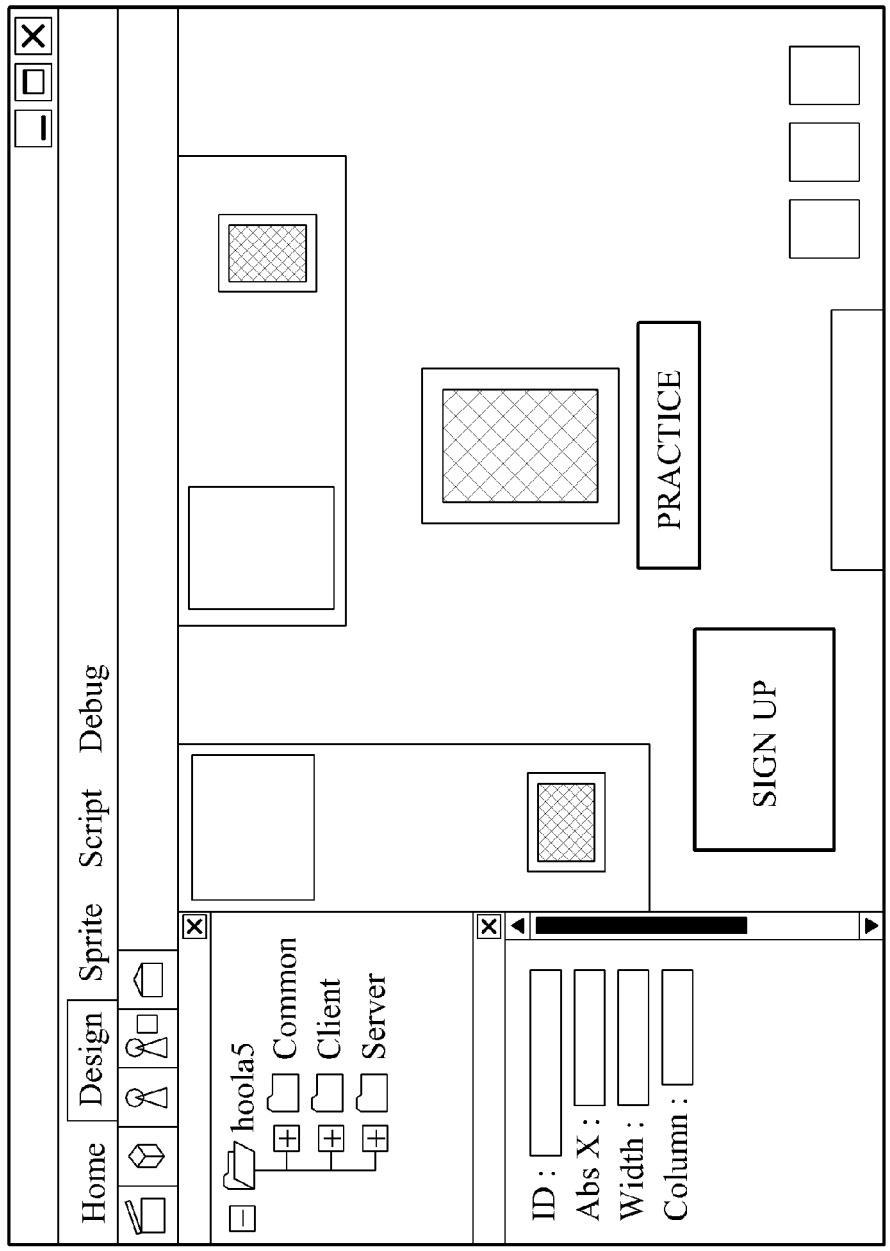
FIG. 12 is a view illustrating a game production screen according to an exemplary embodiment of the present invention.

In operation 5300, a game production screen is provided by executing the game production module 110 for the production of the multi-user network game, which is shown in FIG. 12.

In operation 5310, a game script used to drive the multi-user network game is produced based on a script language using the game production module 110. Operation 5310 may include operations of loading a game level that is pre-produced using the game production module 110, or generating a new game level, and editing the loaded game level or the new game level. The operation of editing the game level may include operations of generating/editing a sprite or an image of the loaded game level or the generated new game level, defining/generating/editing a game object of the loaded game level or the generated new game level, and editing the game script of the loaded game level or the generated new game level.

In operation 5320, a virtual network execution environment is constructed using the emulation module 120, and a game script produced by each of client virtual machines and server virtual machines for executing and debugging the game script is emulated in the virtual network execution environment.

Figure 13:
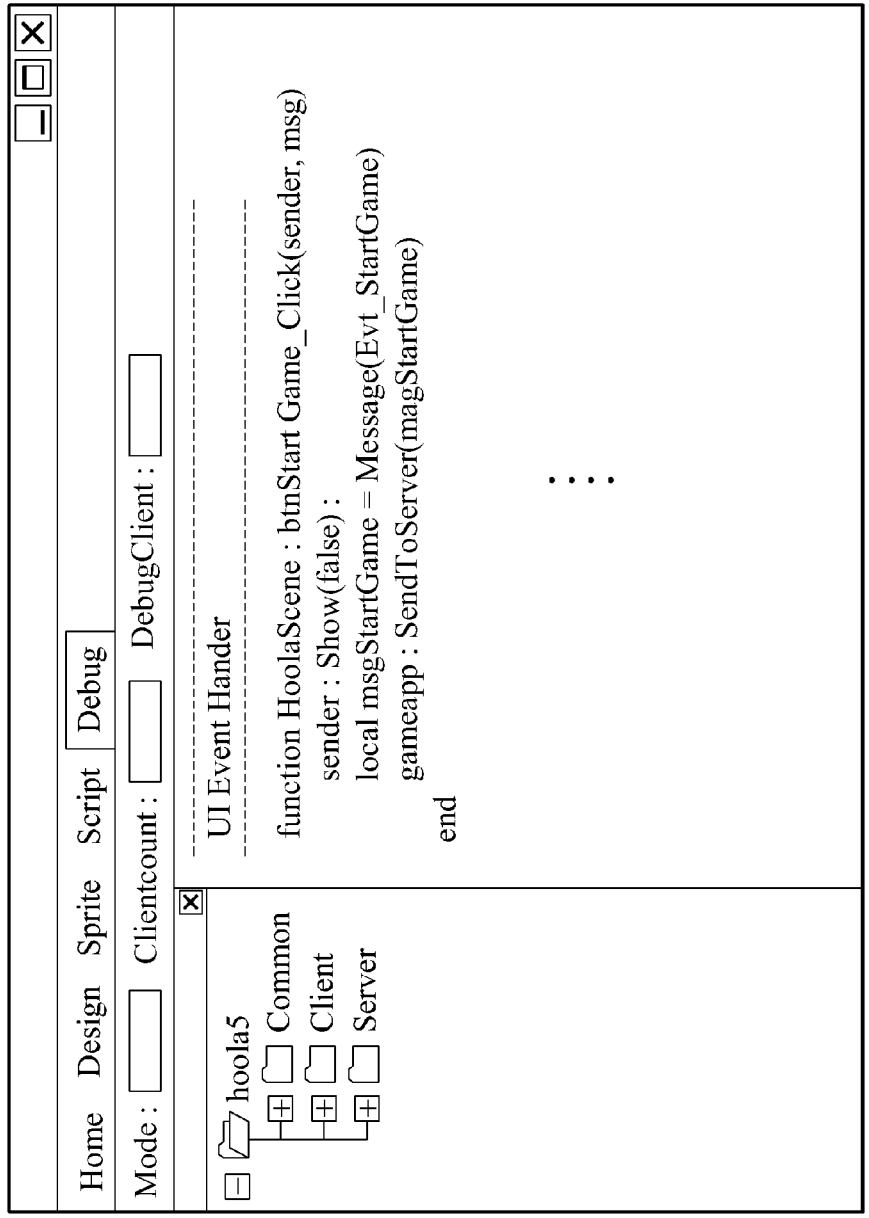
FIG. 13 is a view illustrating a debugging screen via a game production module according to an exemplary embodiment of the present invention.

In operation 5330, the game script produced using the game production module 110 is debugged based on an emulation result of operation 5320, which is shown in FIG. 13.

Figure 14:
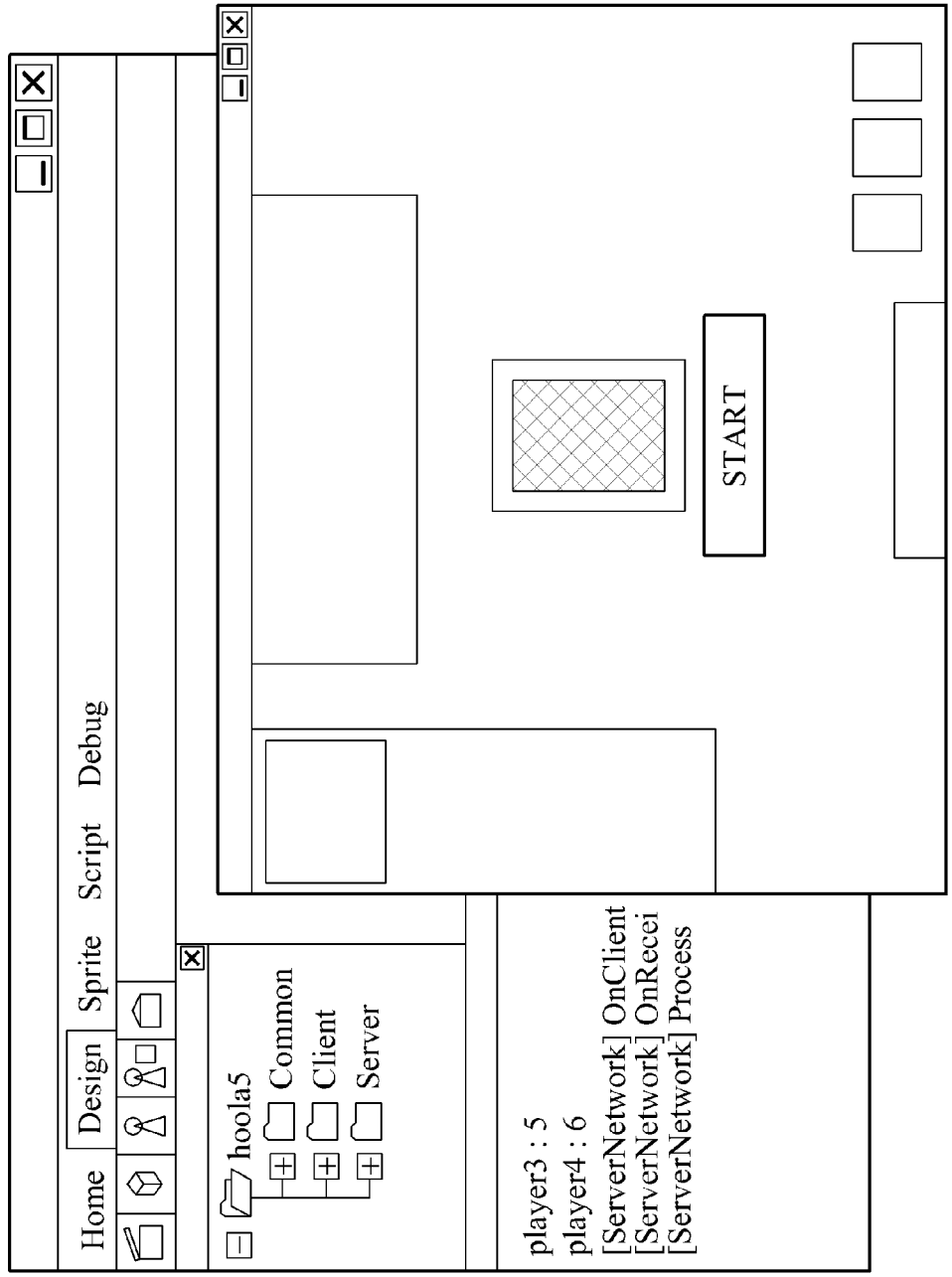
FIG. 14 is a view illustrating an execution screen via a game production module according to an exemplary embodiment of the present invention.

In operation 5340, it is determined whether a game production is completed. Specifically, the game production may be completed by re-emulating the debugged game script in the virtual network execution environment, and by repeating operations S320 and S330 until the game production is completed, which is shown in FIG. 14.

Figure 15:
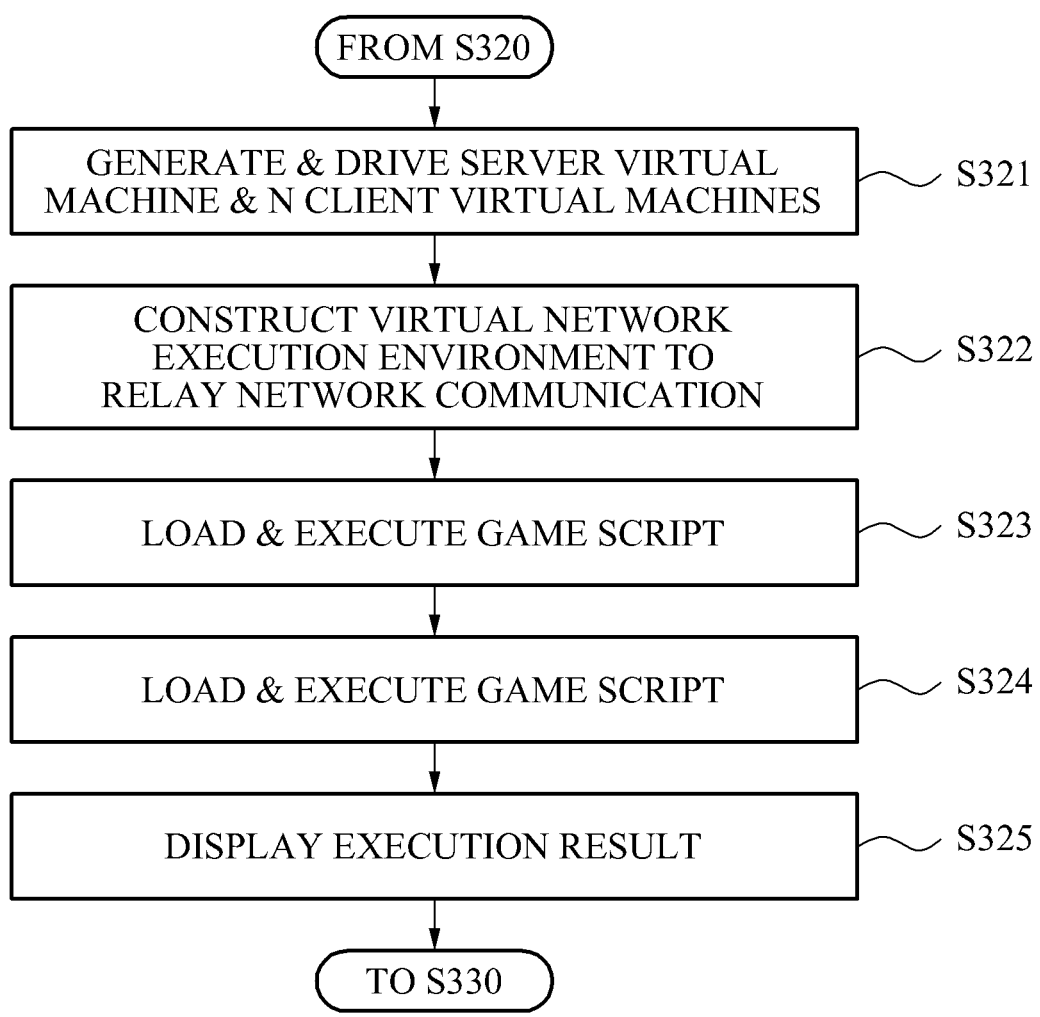
FIG. 15 is a flowchart illustrating an emulation process of a game execution in a game preview operation of FIG. 11.

FIG. 15 is a flowchart for describing an emulation process of FIG. 11.

Hereinafter, the emulation process will be described with reference to FIG. 2 and FIG. 15.

In operation S321, each of a server virtual machine and N client virtual machines is generated and driven using the virtual machine container 200.

In operation S322, a virtual network execution environment is constructed using the network emulator 300 to relay a network communication between the server virtual machine and the N client virtual machines.

In operation S323, a server script is loaded to the server virtual machine and is executed using the virtual machine container 200.

In operation S324, a client script is loaded to each of the N client virtual machines and is executed using the virtual machine container 200.

In operation S325, an execution result of each of the N client virtual machines is displayed on a game production screen.

The emulation process of FIG. 11 may further include an operation of emulating an information transfer between each of the N client virtual machines and the server virtual machine, and an information storage unit configured to store extrinsic information of a virtual game.

Figure 16:
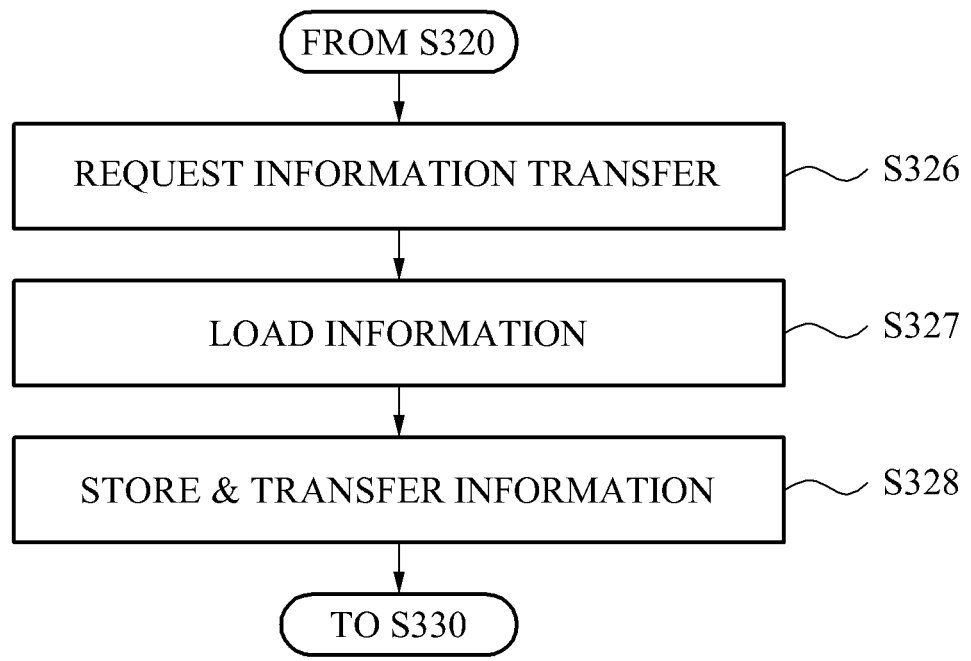
FIG. 16 is a flowchart illustrating an information storage unit emulation process in the game preview operation of FIG. 11.

Specifically, as shown in FIG. 16, in operation S326, when at least one of the client virtual machines and the server virtual machine requests an information transfer, the virtual machine container 200 requests the information storage unit emulator 400 to transfer information.

In operation S327, the information storage unit emulator 400 loads extrinsic information of a corresponding game from the information storage unit 430 using the information loader 410.

In operation S328, the information storage unit emulator 400 stores, in the temporary storage unit 420, the extrinsic information that is loaded using the information loader 410, and transfers the loaded extrinsic information to a corresponding client virtual machine and/or server virtual machine using the virtual machine container 200.

The method for the production of the multi-user network game according to the above-described exemplary embodiments of the present invention may be configured as a program that may be performed using various types of computer units. Here, the program to implement the method for the production of the multi-user network game may be recorded in computer-readable media such as hard disks, compact disc read only memory (CD ROM) disks, digital versatile discs (DVDs), read-only memory (ROM), read access memory (RAM), flash memory, and the like.

As described above, a system and method for production of a multi-user network game according to an exemplary embodiment of the present invention may emulate, in a virtual network execution environment, a multi-user network game that is produced using an emulation module by generating each of at least one client virtual machine and at least one server virtual machine for executing and debugging the multi-user network game. Through this, the system and method for the production of the multi-user network game may produce and debug the multi-user network game and simply construct a multi-user network game environment using a single game production tool to thereby reduce a game production time.

Figure 17:
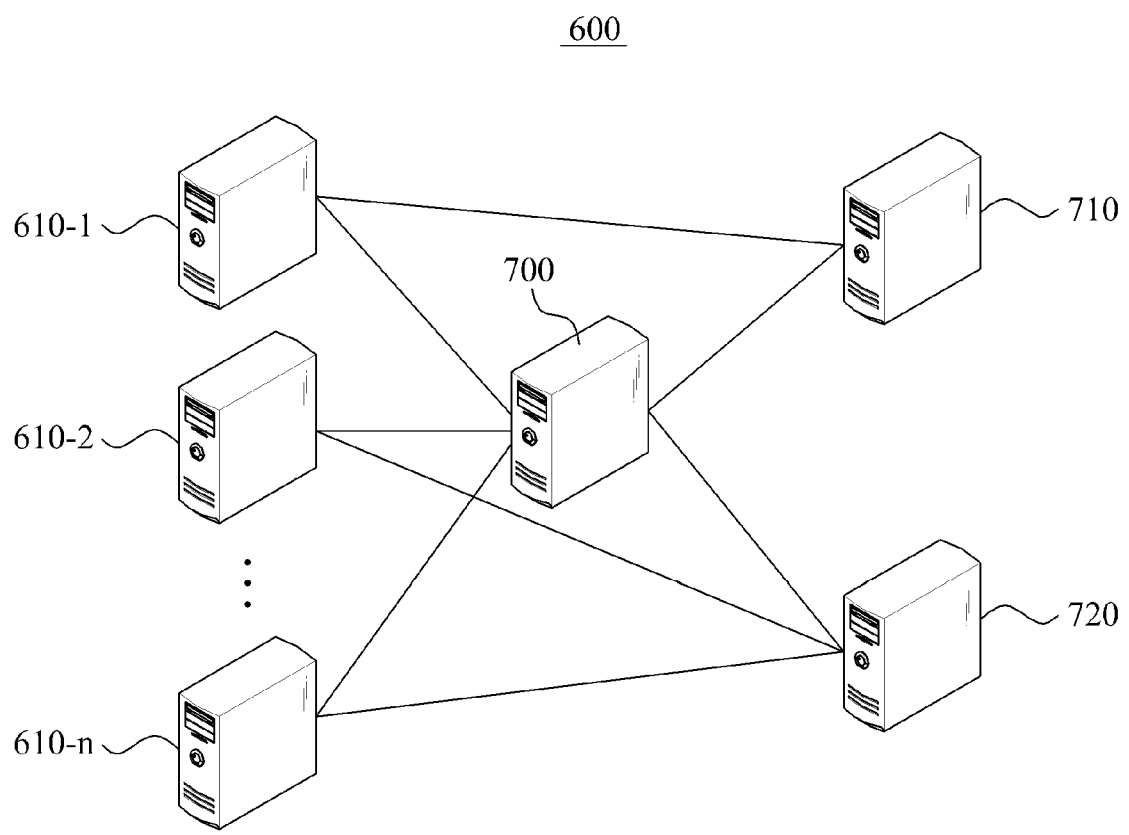
FIG. 17 is a diagram for describing a multi-user network game service system according to an exemplary embodiment of the present invention.

FIG. 17 is a diagram for describing a multi-user network game service system 600 according to an exemplary embodiment of the present invention.

Referring to FIG. 17, the multi-user network game service system 600 may include a plurality of game clients 610-1, 610-2, . . . , 610-n, a game server 700, and backend service servers 710 and 720.

The plurality of game clients 610-1 through 610-n denotes a plurality of terminal devices that is connected to a network to receive various types of game applications, for example, KARTRIDER®, GOGOSSING, GOSTOP®, poker, and the like, and thus may include, for example, a desktop PC, a notebook, a mobile phone, a personal digital assistant (PDA), a Mobile Broadcast System (MBS) phone, and the like.

Figure 18:
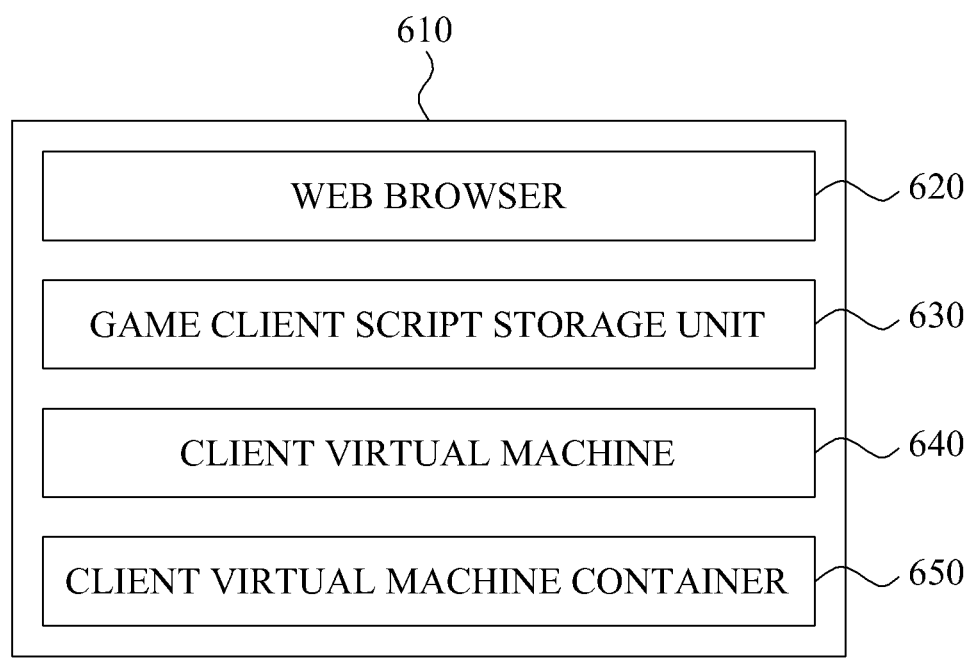
FIG. 18 is a block diagram for describing a game client of FIG. 17.

As shown in FIG. 18, game client 610 may be any of the game clients 610-1 through 610-n and may include a web browser 620, a game client script storage unit 630, a client virtual machine 640, and a client virtual machine container 650.

The game client script storage unit 630 may store a game script file corresponding to a game application. The game script file may be provided via the web browser 620, and may not necessarily be installed in the game client script storage unit 630.

The client virtual machine 640 may load the game script file stored in the game client script storage unit 630 to execute a game.

The client virtual machine container 650 may drive the client virtual machine 640, and transmit game execution information of the client virtual machine 640 to the game server 700. The client virtual machine container 650 may receive game execution information from the game server 700 to provide the received game execution information to the client virtual machine 640. The client virtual machine container 650 is constructed to be the same as the client virtual machine container 210 of the multi-user network game production system of FIG. 3. Therefore, further detailed description related thereto will be omitted here.

Figure 19:
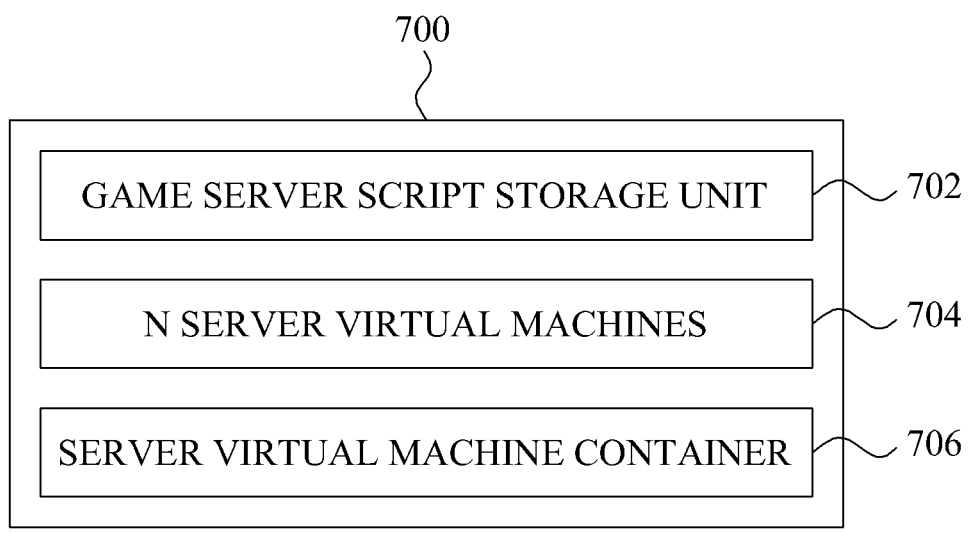
FIG. 19 is a block diagram for describing a game server of FIG. 17.

As shown in FIG. 19, the game server 700 may include a game server script storage unit 702, N server virtual machines 704, and a server virtual machine container 706.

The game server script storage unit 702 may store a game server script file corresponding to a game application.

The N server virtual machines 704 may load game script files stored in the game server script storage unit 702 to execute a game. Here, each of the N server virtual machines 704 may be a game room.

The server virtual machine container 706 may drive each of the N server virtual machines 704, and relay game execution information between the game clients 610-1 through 610-n. The server virtual machine container 706 is constructed to be the same as the server virtual machine container 220 of the multi-user network game production system of FIG. 4. Therefore, further detailed description related thereto will be omitted here.

The backend service servers 710 and 720 may be, for example, a lobby server, a room server, a database module, a ranking service module, a location management service server, and the like.

Similar to the aforementioned multi-user network game production system, a multi-user network game service system according to an exemplary embodiment of the present invention may drive a client virtual machine and a server virtual machine in a network execution environment of a multi-user network game using a virtual machine container 200. Accordingly, it is possible to easily install the developed multi-user network game in the multi-user network game service system, and to create the multi-user network game to easily interoperate with other server systems.

Figure 20:
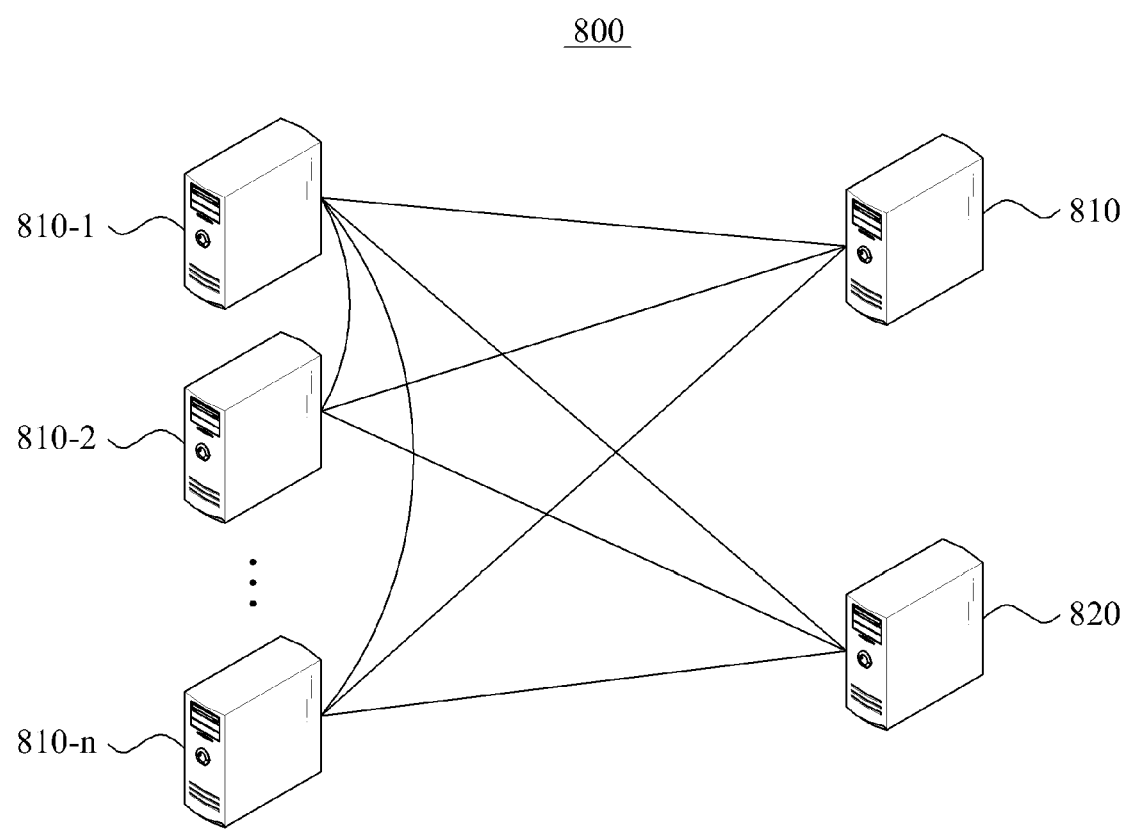
FIG. 20 is a diagram for describing a peer-to-peer (P2P) multi-user network game service system according to another exemplary embodiment of the present invention.

FIG. 20 is a diagram for describing a peer-to-peer (P2P) multi-user network game service system 800 according to another embodiment of the present invention.

Referring to FIG. 20, the P2P multi-user network game service system 800 may include a plurality of game clients 810-1, 810-2, . . . , 810-n that is connected via a network, and backend service servers 810 and 820.

The plurality of game clients 810-1 through 810-n denote a plurality of terminal devices that is connected to the network to receive various types of game applications, for example, KARTRIDER®, GOGOSSING, GOSTOP®, poker, and the like, and thus may include, for example, a desktop PC, a notebook, a mobile phone, a PDA, an MBS phone, and the like.

Figure 21:
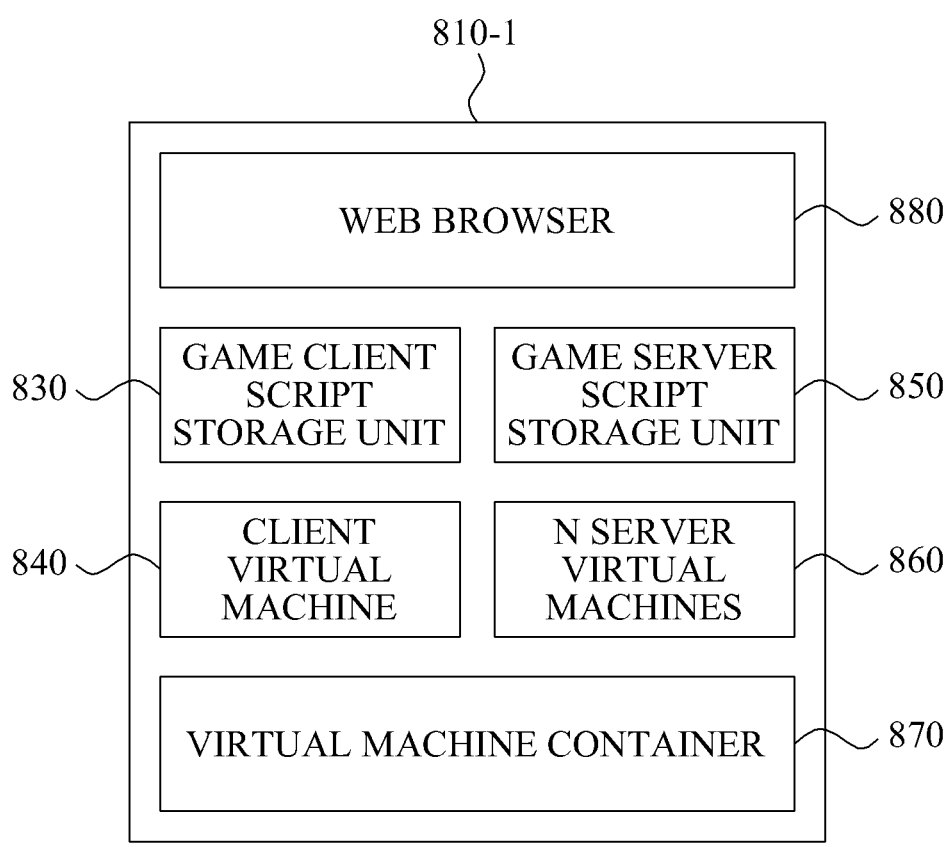
FIG. 21 is a block diagram for describing a game client configured to perform a function of a game server of FIG. 20.

Any one of the game clients 810-1 through 810-n may perform a game server function. As shown in FIG. 21, for example, the game client 810-1 may include a web browser 880, a game client script storage unit 830, a client virtual machine 840, a game server script storage unit 850, N server virtual machines 860, and a virtual machine container 870.

The game client script storage unit 830 may store a game script file corresponding to a game application. Here, the game script file may be provided via the web browser 880, and may not necessarily be installed in the game client script storage unit 830.

The client virtual machine 840 may load the game script file stored in the game server script storage unit 830 to execute a game.

The game server script storage unit 850 may store a game server file corresponding to a game application.

The N server virtual machines 860 may load the game script file stored in the game server script storage unit 850 to execute the game. Here, each of the N server virtual machines 860 may be a game room.

The virtual machine container 870 may drive each of the client virtual machine 840 and the N server virtual machines 860, and may relay game execution information between the game clients 810-1 through 810-*n*.

Each of the remaining game clients excluding a first game client from the plurality of game clients 810-1 through 810-*n*, for example, each of the remaining game clients 810-2 through 810-*n* excluding the game client 810-1 from the plurality of game clients 810-1 through 810-*n* are constructed to be the same as the game clients 610-1 through 610-*n* of FIG. 18. Therefore, further detailed description related thereto will be omitted here.

The backend service servers 810 and 820 may be, for example, a lobby server, a room server, a database module, a ranking service server, a location management service server, and the like.

Like the aforementioned multi-user network game production system, a P2P multi-user network game service system according to an exemplary embodiment of the present invention may drive a client virtual machine and a server virtual machine in a network execution environment of a P2P multi-user network game using a virtual machine container. Accordingly, it is possible to easily install the developed multi-user network game in the P2P multi-user network game service system, and to create the multi-user network game to easily interoperate with other server systems.

Even when a virtual machine container according to an exemplary embodiment of the present invention is installed in various types of consoles such as XBOX 360®, PLAYSTATION® 3, WII®, and the like, the virtual machine container may execute a multi-user network game downloaded from a game service system.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to develop a game to be performed between a game server and a plurality of game clients via a network, the system comprising:
   a storage device;
   one or more modules executable by a processor, the modules, stored in the storage device, comprising:
   a game production module configured to develop the game and to provide an interface to test and to change configuration of the developed game associated with debugging of the developed game; and
   an emulation module comprising a network emulator and a virtual machine container, the network emulator configured to emulate an execution of the developed game by providing a virtual communication network, the emulation module configured to provide one or more network identifiers (IDs) used as virtual addresses to support connections, and the virtual machine container configured to create and to control the connections among a plurality of virtual clients and a plurality of virtual game servers using the network IDs, wherein the virtual communication network is configured to permit communication between one or more of the virtual clients and the virtual servers for executing and debugging the developed game without using an actual network address, wherein the virtual communication network comprises at least one server virtual machine and at least one client virtual machine, and wherein one of the one or more network IDs corresponds to a network ID of the at least one server virtual machine, and a message is transferred from the at least one client virtual machine to the at least one server virtual machine using the network ID of the at least one server machine.

2. The system of claim 1, wherein
   the virtual machine container is configured to emulate an execution of a multi-user network game by generating and controlling each of the at least one client virtual machine and the at least one server virtual machine; and
   the network emulator is configured to emulate a network communication between the at least one client virtual machine and the at least one server virtual machine by constructing the virtual network execution environment.

3. The system of claim 2, wherein the virtual machine container comprises:
   a client virtual machine container configured to execute the multi-user network game by generating the at least one client virtual machine, and to transfer the events, to the at least one client virtual machine or the server virtual machine via the network emulator, the events occurred by the at least one client virtual machine while a game is being executed; and
   a server virtual machine container configured to generate the at least one server virtual machine, to process the events that is transferred from the client virtual machine container via the network emulator, and to transfer the events to the client virtual machine container to process the events via the network emulator.

4. The system of claim 3, wherein the client virtual machine container comprises:
   a client virtual machine drive module configured to generate and drive the at least one client virtual machine;
   a network event management module configured to transfer, to the at least one client virtual machine via the client virtual machine drive module, a network event that is transferred through a network communication with the network emulator;
   an external module interoperation management module configured to conduct interoperation of the at least one client virtual machine with a service system of an extrinsic online service of a corresponding game while the multi-user network game is being executed; and
   a window control management module configured to transfer the game events to the at least one client virtual machine via the client virtual machine drive module, a window configured to display a screen of the multi-user network game and a game event.

5. The system of claim 3, wherein the server virtual machine container comprises:

a server virtual machine drive module configured to generate and to drive the at least one server virtual machine;

a network event management module configured to transfer, to the at least one server virtual machine via the server virtual machine drive module, a network event that is transferred through a network communication with the network emulator;

an external module interoperation management module configured to conduct interoperation of the at least one server virtual machine with a service system of an extrinsic online service of a corresponding game while the multi-user network game is being executed; and a thread control management module configured to provide a thread pool, wherein the server virtual machine drive module is configured to generate and to drive a plurality of server virtual machines.

6. The system of claim 1, wherein the game production module comprises:

a game production user interface configured to provide a user interface to develop a multi-user network game using a game production screen;

a game edit tool configured to develop and to debug the game and a virtual network execution environment; and a game previewer configured to display an execution process of the game on a game production screen by driving the emulation module.

7. The system of claim 6, wherein the game edit tool is provided based on a script language.

8. The system of claim 2, wherein the emulation module further comprises:

an information storage unit emulator configured to emulate an information transfer between the at least one client virtual machine and the at least one server virtual machine, and an information storage unit configured to store extrinsic information of a virtual game, in the virtual network execution environment.

9. The system of claim 8, wherein the information storage unit emulator comprises:

an information loader configured to load extrinsic information of a corresponding game from the information storage unit in response to a request for the information transferred from the at least one client virtual machine or the at least one server virtual machine; and a temporary storage unit configured to store the loaded extrinsic information, and to transfer the stored extrinsic information to at least one of the corresponding virtual machine among the at least one client virtual machine and the at least one server virtual machine.

10. The system of claim 9, wherein the extrinsic information comprises a script file generated using a script language.

11. The system of claim 1, wherein the processor is configured to drive at least one of the plurality of the virtual clients as a real client and one of the plurality of virtual game servers as online-game servers via an actual network environment without using the emulation module, and wherein the developed game is installed in any platform comprising a peer-to-peer (P2P) computer network and interoperable with any other server system.

12. A method for developing a multi-user network game to be performed between a game server and a plurality of game clients via a network, the method comprising:

providing a game production module to develop the game by producing a game script for the game based on a script language using the game production module, wherein an interface is configured to test and to debug the game script; and constructing a virtual network without using an actual network address by integrating at the least one server virtual machine and the at least one client virtual machine by providing one or more network identifiers (IDs) as virtual addresses to support connections, the at least one of the server virtual machines and the at least one of the client virtual machines being configured to execute the game script and to emulate an execution of the game script in the virtual network configured between the server virtual machines and the client virtual machines using the network IDs, wherein the virtual network comprises at least one server virtual machine and at least one client virtual machine, and wherein one of the one or more network IDs corresponds to a network ID of the at least one server virtual machine, and a message is transferred from the at least one client virtual machine to the at least one server virtual machine using the network ID of the at least one server machine.

13. The method of claim 12, further comprising:

generating and driving each of the at least one client virtual machine and the at least one server virtual machine using a virtual machine container;

constructing the virtual network execution environment to relay a network communication between the at least one client virtual machine and the at least one server virtual machine using a network emulator;

loading and executing a server game script to the at least one server virtual machine using the virtual machine container;

loading and executing a client game script to the at least one client virtual machine using the virtual machine container; and displaying an execution result of the at least one client virtual machine.

14. The method of claim 12, further comprising:

loading a game level that is pre-developed using the game production module, or generating a new game level; and editing the loaded game level or the generated new game level to generate the game script.

15. The method of claim 14, further comprising:

generating and editing a sprite or an image of the loaded game level or the generated new game level;

defining, generating, and editing a game object of the loaded game level or the generated new game level; and editing the game script of the loaded game level or the generated new game level.

16. The method of claim 12, further comprising:

emulating an information transfer between the at least one client virtual machine or the at least one server virtual machine, and an information storage unit configured to store extrinsic information of the game.

17. The method of claim 16, further comprising:

loading extrinsic information of the game from the information storage unit in response to a request for the information transfer from the at least one client virtual machine or the at least one server virtual machine;

temporarily storing the loaded extrinsic game information; and transferring the temporarily stored extrinsic information to the at least one virtual machine among the at least one client virtual machine and the at least one server virtual machine.

18. The method of clam 17, wherein the extrinsic information comprises a script file generated using a script language.

19. A non-transitory computer-readable storage medium comprising an executable program stored thereon, which when executed by a microprocessor to perform the following method:
  providing a game production module to develop the game by producing a game script for the game based on a script language using the game production module, wherein
  an interface is configured to test and to debug the game script; and
  constructing a virtual network without using an actual network address by integrating at least one server virtual machine and at least one client virtual machine by providing one or more network identifiers (IDs) as virtual addresses to support connections, the at least one of the server virtual machines and the at least one of the client virtual machines being configured to execute the game script and to emulate an execution of the game script in the virtual network configured between the server virtual machines and the client virtual machines using the network IDs, wherein
  the virtual network comprises the at least one server virtual machine and the at least one client virtual machine, and wherein one of the one or more network IDs corresponds to a network ID of the at least one server virtual machine, and a message is transferred from the at least one client virtual machine to the at least one server virtual machine using the network ID of the at least one server machine.

* * * * *